United States Patent
Neumueller et al.

(10) Patent No.: US 8,782,470 B2
(45) Date of Patent: Jul. 15, 2014

(54) GENERATION OF TEST DATA FOR WEB SERVICE-BASED TEST AUTOMATION AND SEMI-AUTOMATED TEST DATA CATEGORIZATION

(75) Inventors: Albert Neumueller, Walldorf (DE); Walter Zimmermann, Walldorf (DE); Christian Hohmann, Walldorf (DE); Olga Kreindlina, Heidelberg (DE); Oliver Berger, Walldorf (DE); Torsten Buecheler, Speyer (DE); Martin Haerterich, Wiesloch (DE); Knut Heusermann, Bad Schoenborn (DE); Xenia Rieger, Walldorf (DE); Guang Yang, Bad Schoenborn (DE); Marcus Echter, Walldorf (DE); Matthias Becker, Bruchsal (DE); Dietmar Henkes, Schwetzingen (DE); Sophie Kraut, Walldorf (DE)

(73) Assignee: SAP AG, Walldorf, DE (US)

( * ) Notice: Subject to any disclaimer, the term of this patent is extended or adjusted under 35 U.S.C. 154(b) by 320 days.

(21) Appl. No.: 13/309,337

(22) Filed: Dec. 1, 2011

(65) Prior Publication Data
US 2013/0145250 A1 Jun. 6, 2013

(51) Int. Cl.
*G06F 11/00* (2006.01)

(52) U.S. Cl.
USPC .............................. 714/37; 714/25; 714/38.1

(58) Field of Classification Search
USPC ........... 714/25, 26, 27, 32, 33, 37, 38.1, 47.1; 715/234; 717/124
See application file for complete search history.

(56) References Cited

U.S. PATENT DOCUMENTS

| 2006/0101397 A1* | 5/2006 | Mercer et al. ................ 717/124 |
| 2006/0150026 A1* | 7/2006 | Kolawa et al. ................ 714/38 |
| 2007/0083793 A1* | 4/2007 | Roth ............................... 714/25 |
| 2009/0199160 A1* | 8/2009 | Vaitheeswaran et al. ...... 717/124 |
| 2009/0204591 A1* | 8/2009 | Kaksonen ...................... 717/124 |

* cited by examiner

*Primary Examiner* — Joseph D Manoskey
(74) *Attorney, Agent, or Firm* — Fountainhead Law Group PC (57) ABSTRACT

Test data for a software services (e.g., a Web service) can be automatically generated from a user-provided specification. The user-provided specification may identify mandatory data elements along with data elements to be tested. Test categories may be defined to specify the type of test to be performed. A value provider may serve as a source of data values for the generated test data.

20 Claims, 8 Drawing Sheets

```xml
<n0:TransportationZoneBundleMaintenanceCheckQuery_sync xmlns:n0="http://sap.com/xi/SAPGlobal20/Global">
<BasicMessageHeader />
<TransportationZone descriptionListCompleteTransmissionIndicator=""
postalCodeIntervalListCompleteTransmissionIndicator="" regionListCompleteTransmissionIndicator="" >
<ID>ITF_TRANS_ZONE</ID>
<Description>
<Description languageCode="" />
</Description>
<PostalCodeInterval>
<InclusionExclusionCode />
<IntervalBoundaryTypeCode />
<CountryCode />
<LowerLimitPostalCode />
<UpperLimitPostalCode />
</PostalCodeInterval>
<Region>
<CountryCode />
<RegionCode />
</Region>
</TransportationZone>
</n0:TransportationZoneBundleMaintenanceCheckQuery_sync>
```

Reference XML

Fig. 5A

```
<nm:TransportationZoneBundleMaintenanceCheckQuery_sync
xmlns:nm="http://sap.com/xi/SAPGlobal20/Global">
 <BasicMessageHeader/>
 <TransportationZone actionCode="04">
  <ID>ITF_TRANS_ZONE</ID>
  <Description actionCode="04">
   <Description/>
  </Description>
 </TransportationZone>
</nm:TransportationZoneBundleMaintenanceCheckQuery_sync>
```

Fig. 5B

```
<nm:TransportationZoneBundleMaintenanceCheckQuery_sync
xmlns:nm="http://sap.com/xi/SAPGlobal20/Global">
 <BasicMessageHeader/>
 <TransportationZone actionCode="04">
  <ID>ITF_TRANS_ZONE</ID>
  <Description actionCode="04">
   <Description>First Valid String</Description>
  </Description>
 </TransportationZone>
</nm:TransportationZoneBundleMaintenanceCheckQuery_sync>
```

Fig. 5C

| Message Element Type | Supported Test Cases (Positive) | Supported Test Cases (Negative) |
|---|---|---|
| anyURI | Initial, 'http://www.sap.com' | 'Arbitrary String' |
| Base64binary | Initial, sdafkjfgdjsdvaj | - |
| Boolean | Initial, 'true', 'false' | - |
| Date | sy-datum | 30.02.2010 |
| DateTime | Initial, now | 30.02.2010T00:00:00 |
| Decimal | Initial, 20, -3000 | - |
| Duration | Initial, PT10041990059S | 1Y, P-1Y |
| Float | Initial, 20.56E+03, -20.56E+03 | - |
| Int | Initial, 20, -3000 | - |
| Language | Allowed Language (e.g. DE) | Not Allowed Language (e.g. AF) |
| String | Initial, 'First Valid String', 'Second Valid String' | Special Chararacters, Carriage Return |
| Time | Initial, sy-uzeit | 25:00:00, -11:00:00 |
| Token | Valid Code, Valid ID | Invalid Code |

GENERATION OF TEST DATA FOR WEB SERVICE-BASED TEST AUTOMATION AND SEMI-AUTOMATED TEST DATA CATEGORIZATION

BACKGROUND

The present invention relates to Web services and in particular to testing Web service interfaces.

Unless otherwise indicated herein, the approaches described in this section are not prior art to the claims in this application and are not admitted to be prior art by inclusion in this section.

The term "Web services" describes a standardized way of accessing Web-based applications over the Internet, or more generally any communication network. Web services are typically used by businesses to communicate with each other and with clients. Web services allow businesses to communicate data without intimate knowledge of each other's systems.

Figure 1:
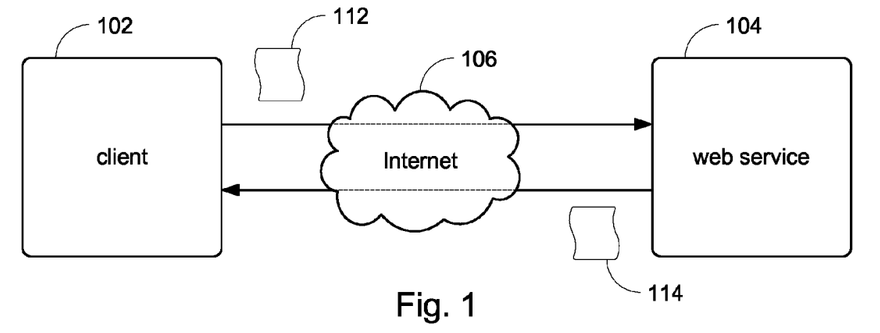
FIG. 1 illustrates a typical communication sequence for web services.

When a client and a Web service communicate they exchange messages. See, for example, FIG. 1 where a request message 112 is sent from a client 102 to a Web service 104 over a communication network 106, such as the Internet. The Web service 104 responds with a response message 114. The client 102 serves as an interface to the Web service 104, and provides a user interface to receive data from a user. For example, a simple interface may be form having input fields into which a user enters data. The client 102 wraps that data into a suitable request message 112 that is then transmitted to the Web service 104. The Web service 104 receives the message 112, performs one or more services to service the request message 112, and generates a response message 114 that is transmitted to the client 102.

Web services are based on several well known standards. For example, the Extensible Markup Language (XML) definition is used to tag the data. The Simple Object Access Protocol (SOAP) is used to transfer the data. Services provided by the Web service 104 may be described and defined using the Web Services Definition Language (WSDL). Web services may be discovered using the Universal Description Discovery and Integration (UDDI) definition which provides a method for publishing and finding service descriptions.

Testing the behavior of Web services always requires the assembling of individual test data for each test case. Suppose a data element called DATE is provided in a Web service. Examples for test cases for testing the DATE data element may include:

Positive (valid data) test case for DATE: . . . <DATE>01.01.2011</DATE>
Negative (invalid data) test case for DATE: . . . <DATE>31.02.2011</DATE>

Performing a proper test on a Web service may require testing several valid and invalid data values for each input field comprising the interface for the Web services. Consequently, a large number of test cases may have to be generated to test each input field and different values for each input field. Assembling huge amounts of test data manually is very time consuming. In addition it is very error-prone and requires a lot of manual changes, when the Web Services are changed.

These and other issues are addressed by embodiments of the present invention, individually and collectively.

SUMMARY

A method for generating test data for a software service includes accessing a Reference XML that identifies data elements in the software service to be tested. A test document may be generated for one of the data element identified in the Reference XML. Metadata information characterizing the data element may be obtained. A data pool may be accessed in order to obtain a suitable data value. In embodiments, the data value may determined based on the metadata information. The test data document may be a request message that can be sent to the software service.

In embodiments, the Reference XML includes mandatory data elements and corresponding default data values. These mandatory data elements may be needed in order for the software service to execute correctly. The test data may include the mandatory data elements and their corresponding default values.

In embodiments, a second test document for a second data element may be generated. The first and second test documents may be stored in a test data container.

The test data may be generated in accordance with a test category. In embodiments, the test categories include positive element tests and negative element tests. In other embodiments, the test categories include positive tests for delta handling and negative tests for delta handling. In still other embodiments, the test categories include positive all-pairs testing and negative all-pairs testing.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 2:
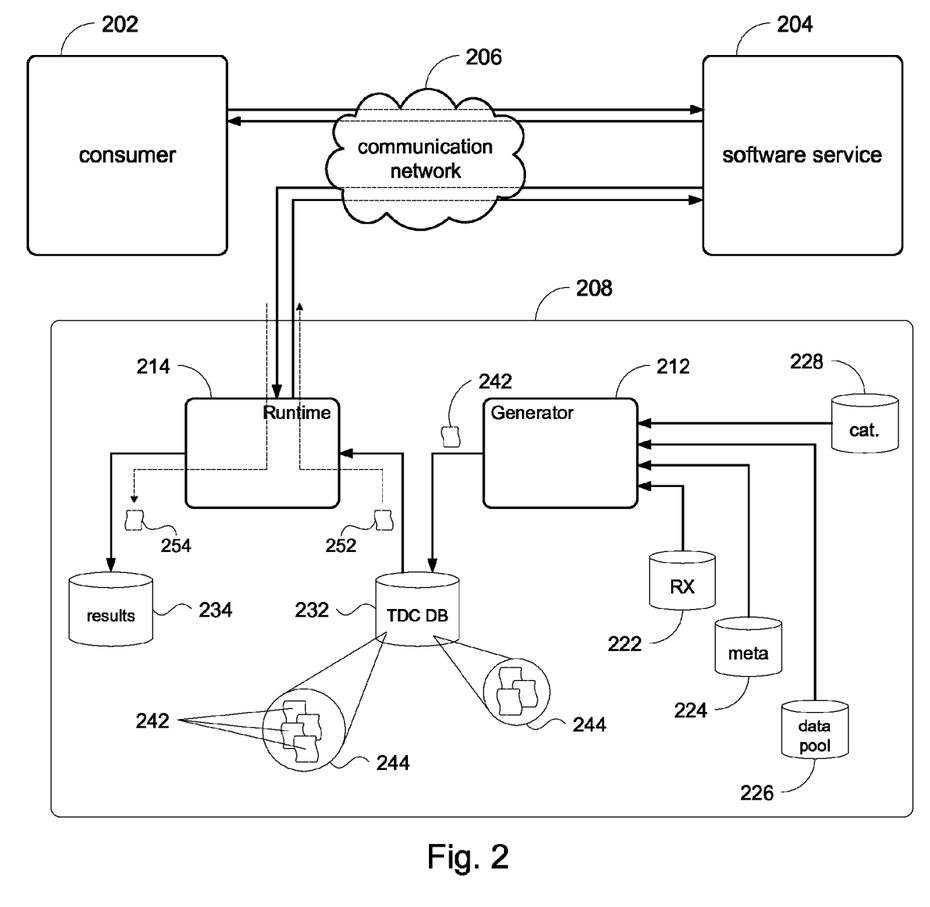
FIG. 2 illustrates a configuration for software services and includes a test system in accordance with principles of the present invention.

In embodiments, a system such as illustrated in FIG. 2 may be configured for automatically generating test data for a software service.

Referring to FIG. 2, a configuration in accordance with principles of the present invention is shown. Typically, a service consumer 202 (e.g., a Web client) sends request messages to a software service 204 (e.g., an XML-based Web service) over a communication network 206 (e.g., Internet, local area network, and the like). For example, the service consumer 202 may be a user interface component in a first business application. A user of the first business application may need to update business object instances in a second business object application. Accordingly, the second business application may provide access to its business object instances via the software service 204.

During the implementation of the software service 204, testing is an important activity before bringing the software service online. Testing the software service 204 typically requires the assembling of individual test data for each test case. The testing amounts to generating a request message with specific data and sending the "test" request message (the "test data") to the software service, and observing its behavior to the test request message. For example, the response message from the software service may indicate a response code (e.g., OK, FAIL, etc.) and may include other information that can be used to assess the response of the software service.

In embodiments, a test system 208 comprising a test data generator 212 and a runtime environment 214 may perform automated testing of the software service 204 in accordance with the present invention. The test data generator 212 generates test data 242 which are stored in a database 232. The test generator 212 receives input from several data stores 222-228, which are shown in FIG. 2 as separate data repositories, but may be any suitable form of storage such as files, databases, and so on.

A first data store 222 identifies data elements in the software service 204 to be tested. In an embodiment, the first data store 222 is an XML file referred to as a Reference XML. The Reference XML 222 is a document that is created by a user. The user may specify, in the Reference XML 222, the data elements which constitute the software service 204 that are to be tested. The Reference XML 222 may include mandatory data elements necessary for the software service to function. In an XML document, data elements are identified by "tags".

A second data store 224 comprises metadata information about the data elements that comprise the software service 204. For example, the metadata information may include "data types" of the data elements; i.e., whether a data element is an integer value, or a date value (e.g., Mar. 1, 2000), or a time value (e.g., 2:00:00 GMT), and so on. A third data store 226 comprises a repository of data values, such as "1", "2", "1000", "http://sap.com", TRUE, FALSE, and so on. As will be explained below, the third data store 226 may be used as a source of data values for generating test data. A fourth data store 228 identifies the test categories for which test data can be generated. If a new test category is defined, this data store would be updated to include the new test category.

The database 232 contains the test data 242 that is generated by the test data generator 212. In embodiments, the test data are 242 are represented in a request message. A request message 242 represents a test to be performed on the software service interface 204. A set of request messages 242 are bundled into a test data container (TDC) 244. The database 232 is a repository of TDCs 244.

In embodiments, the runtime environment 214 may read out a request message 252 from the database 232, and send it to the software service 204. The software service 204 may respond to the runtime environment 214 with a result code in a response message 254. The runtime environment 214 may store the response message 254 in a results database 234.

In embodiments, the test data 242 comprise a request message to test data element(s) in the software service 204. For example, suppose the software service 204 defines a data element identified by the tag COLOR, and that valid values for COLOR are Black and White. The test data generator 212 may generate test data 242 to test for COLOR being set to Black. Accordingly, the test data 242 may comprise a properly formed request message that includes the line:
<COLOR>Black</COLOR>
This is an example of a "positive element" test, since the request message tests for a valid value. By contrast, the following line would represent a "negative element" test:
<COLOR>Red</COLOR>
since Red is not a valid value. In embodiments, the test data generator 212 can generate test data 242 (e.g., request messages) for positive element tests and for negative element tests.

In embodiments, a request message 242 may test an individual data element in the software service 204. Such a test may be referred to as a "simple test". Accordingly, if a software service 204 defines ten data elements, and a user desires to perform a set of "simple tests" to test one valid value and one invalid value for each date element, then the test data generator 212 may define a TDC 244 that contains twenty request messages 242. Each request message 242 would test one of the ten data elements, and would test either a valid value or a invalid value for that data element.

It will be understood, that for any given software service 204, a properly formed request message 242 may require the inclusion of certain mandatory data elements necessary for the software service to function. For example, a software service may require that a customer be specified, and so a request message may need to provide a data values for a customer identifier data element. Data values for other data elements may need to be provide as well; e.g., an account number, date information, and so on. Accordingly, the Reference XML 222 may include the mandatory data elements along with default data values that the software service 204 may require in a request message 242, in addition to the non-mandatory data elements that are to be tested.

Figure 3:
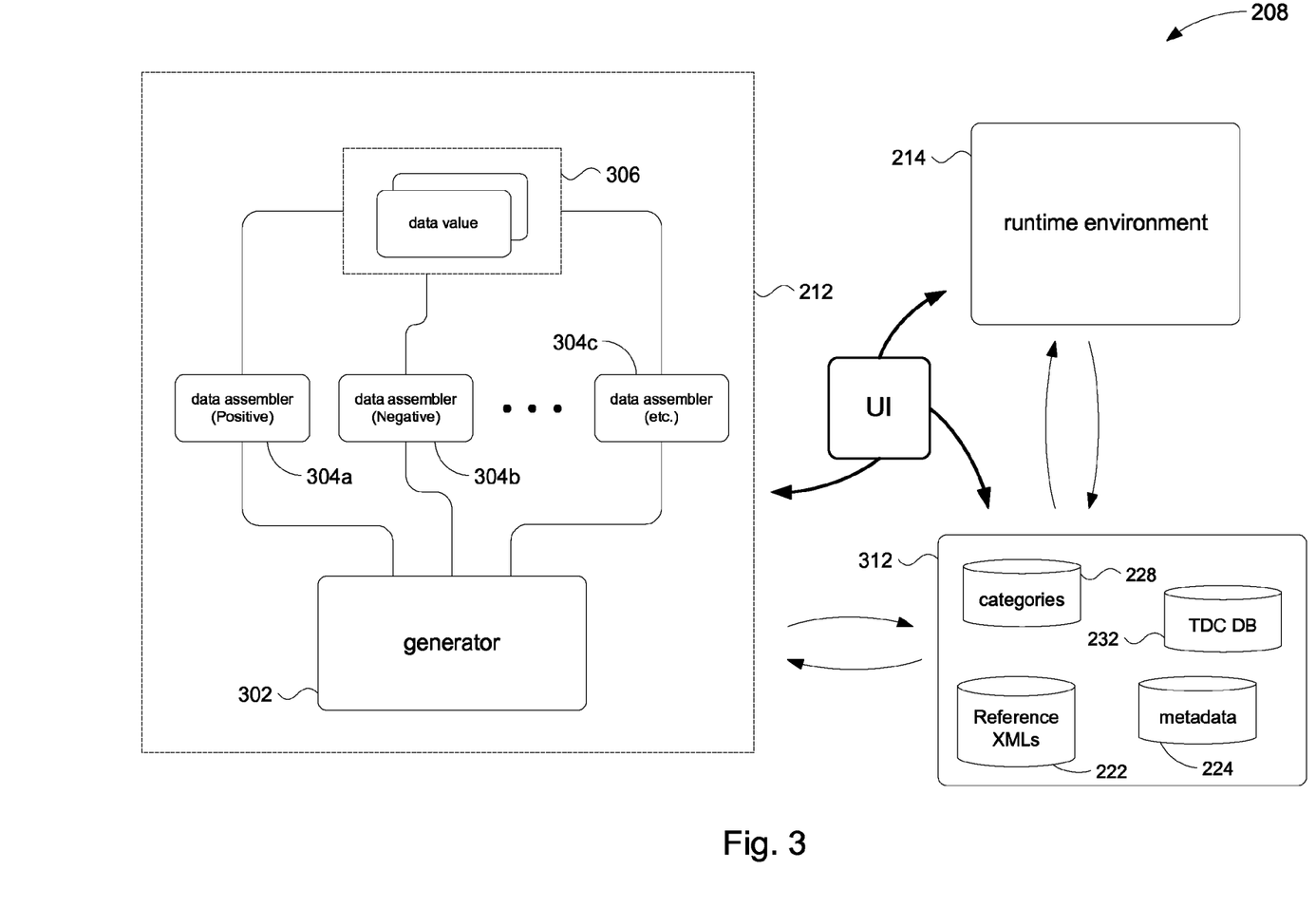
FIG. 3. illustrates details of the test system.

FIG. 3 shows details of the test data generator 212 in accordance with embodiments of the present invention. The various data stores 222-228 are represented in FIG. 3 as logical persistent data storage 312 element. The test data generator 212 comprises a generator component 302. The generator component 302 may receive a input from a user as a trigger to begin test data generation processing. In embodiments, data assemblers 304a, 304b, 304c are invoked by the generator component 302 to assemble the request messages 242 which constitute the test data.

A value provider 306 constitutes a pool of data values that feed into the data assemblers 304a-304c. In an embodiment, the value provider 306 comprises data values for various data types. For example, a data value of data type DATE might be "Jan. 1, 2010", a data value for data type FLOAT might be "0.01", and so on. The value provider 306 may store a valid data value and an invalid data value for each data type. Thus, for example, the data type DATE may have a valid data value of "Jan. 1, 2010", and an invalid data value of "Jan. 54, 2010", or Feb. 30, 2011".

As illustrated in FIG. 3, in some embodiments a user interface (UI) may be provided, for example, to allow a user to identify the software service to be tested, to specify the data elements of the software service to be tested, and so on. The UI allows the user to invoke the test data generator 212, and then to invoke the runtime environment 214 to test the software service.

Figure 4:
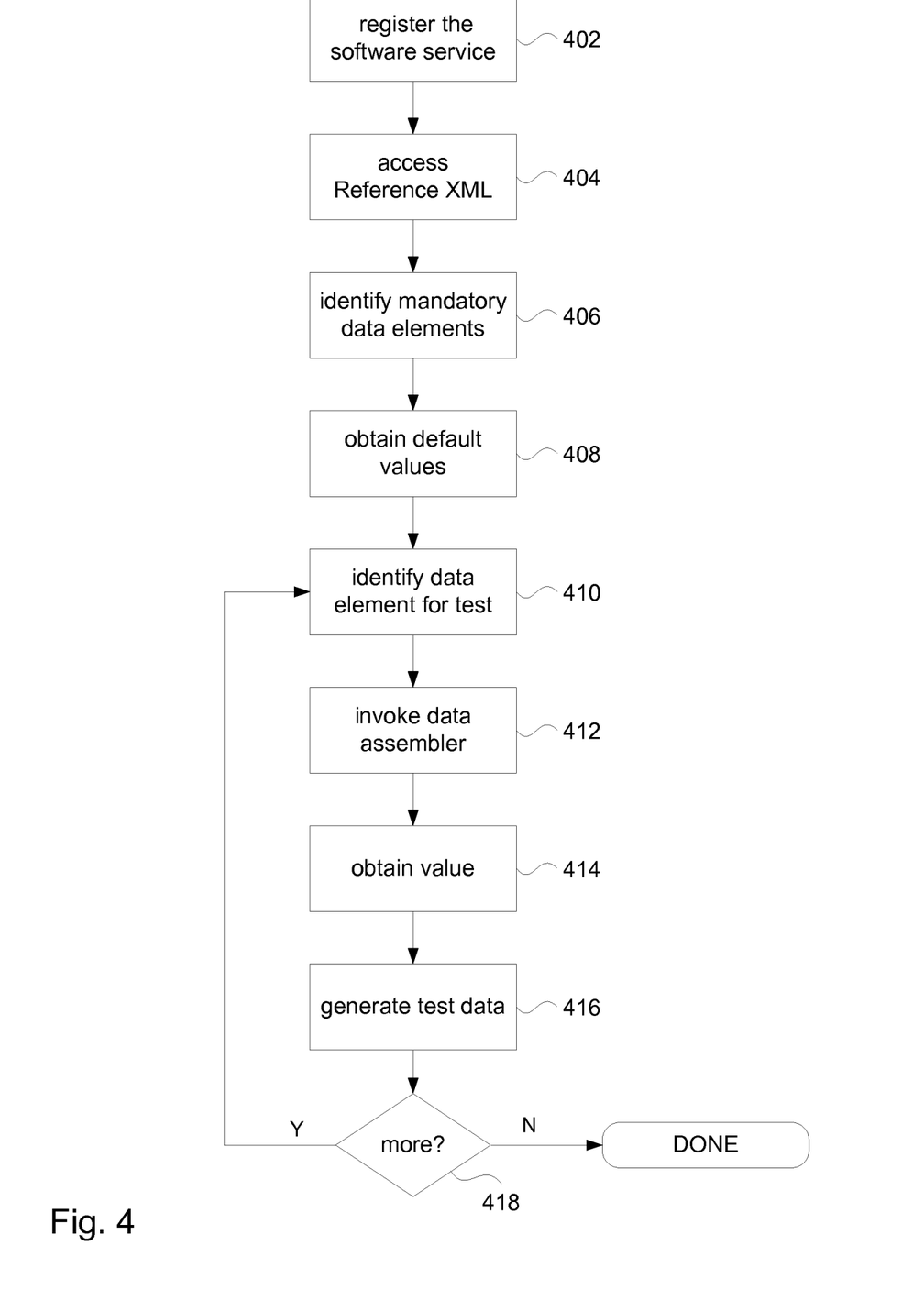
FIG. 4 is a flowchart of a workflow in the test system.

FIG. 4 shows a work flow for generating test data in accordance with embodiments of the present invention. The user may initiate the process, at a step 402, by registering the software service 204 to be tested and specifying a test category. A new TDC 244 may be created in the database 232 that is associated with the software service to be tested. The TDC 244 will contain test data (e.g., one or more request messages) to test one or more of the data elements which constitute the software service 204.

Figure 5A:
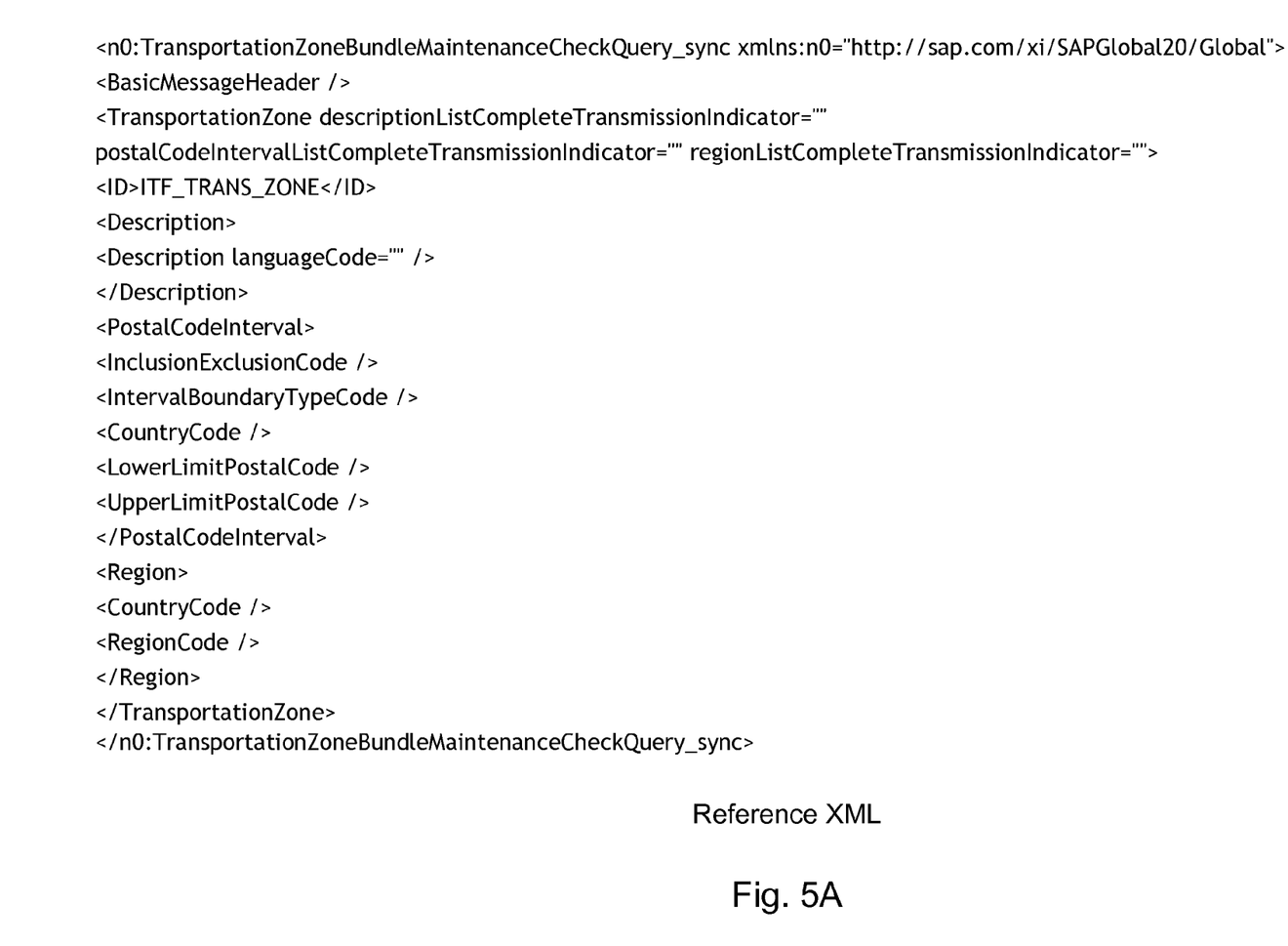
FIG. 5A depicts an example of a Reference XML.

The user may specify a Reference XML 222. In embodiments, the Reference XML 222 is an XML document that can be created by the user (e.g., the developer of the software service). As discussed above, the Reference XML 222 specifies which data elements of the software service are to be tested. In addition, the Reference XML 222 may include "mandatory" data elements and respective default values. A data element may be mandatory if it is required to execute the software service correctly; e.g., a User ID, or an Account Number, and so on. Mandatory data elements may also include data elements for which semantically correct test data cannot be automatically generated. FIG. 5A illustrates an example of a Reference XML 222.

At a step 404, the generator component (302, FIG. 3) is invoked. The generator component 302 may access a Reference XML 222. For example, the Reference XML 222 may be the one created by the user at step 402, or the Reference XML 222 may be a previously created document stored in a data store. In a step 406, the generator component 302 may scan the Reference XML 222 to identify any mandatory data elements. Data values for the mandatory data elements may then be obtained in a step 408. For example, the Reference XML 222 may include default values for the mandatory data elements, in which case the data values may be obtained from the Reference XML. Next, the generator component 302 proceeds to process each of the non-mandatory data elements to be tested.

Accordingly, in the loop defined by steps 410 and 418, the generator component 302 obtains (step 410) from the Reference XML 222 a first non-mandatory data element to be tested. An appropriate data assembler 304a, 304b, 304c is invoked (step 412) depending on the test category specified by the user in step 402. For example, a "positive element" test is a test category in which the behavior of the software service 204 is tested when it receives valid data values. For instance, when the software service 204 it receives "Mar. 1, 2010" for a date element of data type DATE, the expected response would some form of positive response (e.g., an OK return code, no error return code, no error message, etc.). If the software service 204 responds with a negative response, that tells the developer that there may be a bug in the software service. Another test category is a "negative element" test. This test category is similar to the positive element test, but for invalid values. Referring to FIG. 3, data assembler 304a is invoked for the positive element test category, data assembler 304b is invoked for the negative element test category, and other data assemblers 304c may be provided for other test categories.

Figure 6:
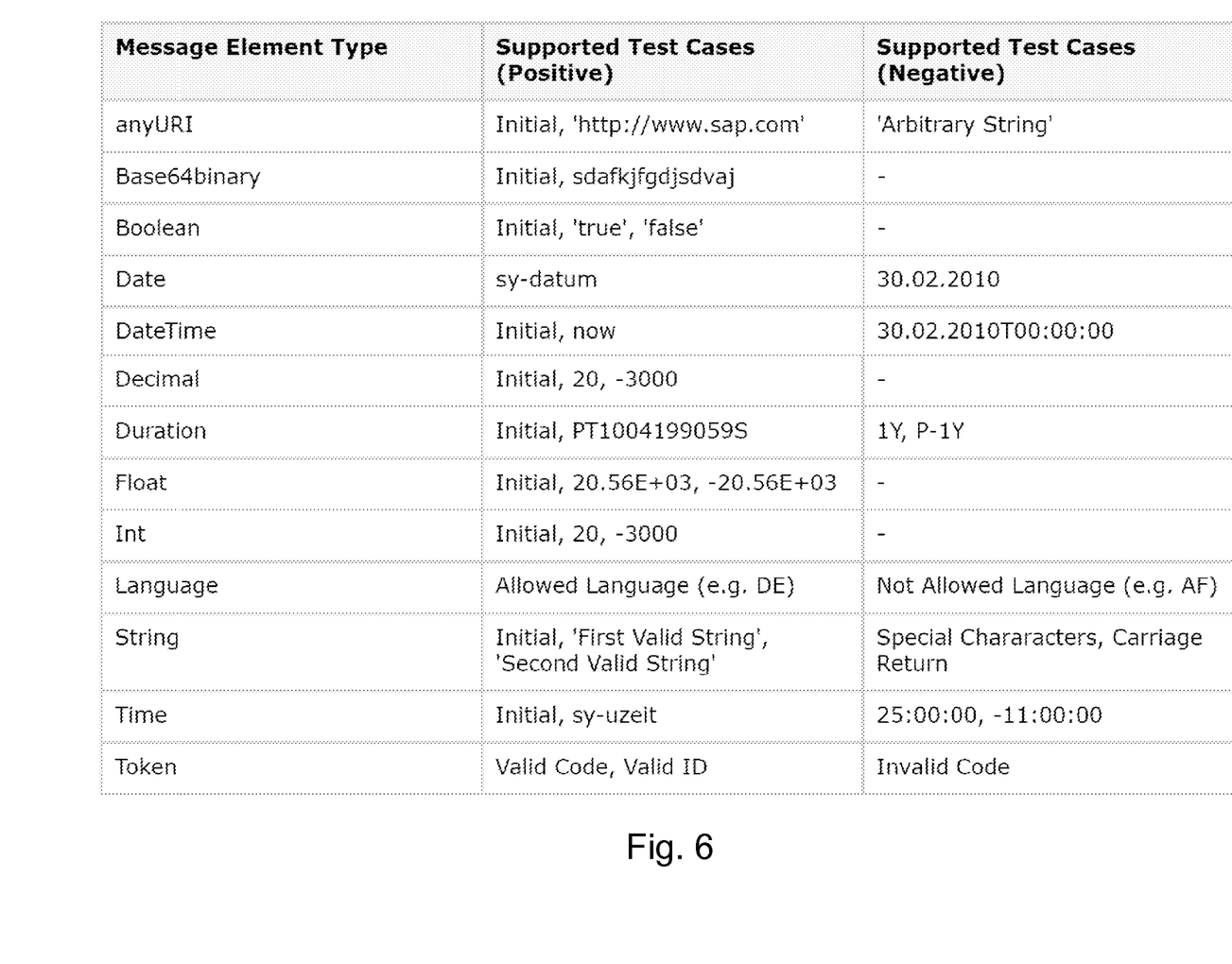
FIG. 6 depicts an example of data types.

In a step 414, the data assembler (e.g., 304a) obtains a suitable data value for the data element to be tested. In embodiments, the data assembler may access the metadata information 224 (FIG. 3) to determine the data type of the data element to be tested. For example, if the data element to be tested is of type TEXT, then the data value would be a text string. The data assembler accesses the value provider 306 to obtain a suitable data value according to the data type of the data element to be tested. In an embodiment, the value provider 306 may support data types listed according to the table shown in FIG. 6, to provide data values for positive element tests and for negative element tests.

In embodiments, the metadata information 224 may include characteristics about each data element in addition to data type. For example, a data element of data type INTEGER may only have a valid range of integers; e.g. the integers from 1-10. Accordingly, the metadata information 224 may include information that can be used by the data assembler (e.g., 304a) to obtain a suitable value (whether valid of invalid) from the value provider 306. The metadata information 224 may enumerate data values for a data element; e.g., {MONDAY WEDNESDAY FRIDAY} may be deemed to be invalid days for a data element of data type WEEKDAYS, and so on.

In a step 416, the test data 242 (FIG. 2) is assembled. In embodiments, the test data is manifested as a request message that can be sent to the software service 204. The mandatory data elements and their respective default values from steps 406 and 408 are incorporated into the request message 242 so that that software service 204 receives the requisite data elements in order for the software service to execute correctly. The data element to be tested and its corresponding obtained data value (from steps 412 and 414) are incorporated into the request message 242 in order to test a given data element. For example, the following form may appear in the request message:

<TagName>tag-value</TagName> where TagName is an identifier of the data element, and "tag-value" is the obtained data value. Additional components may be added to the request message 242 to create a properly formed request message. The properly formed request message 242 may then be added to the TDC 244 created in step 402. The test data assembly step 416 may be performed by the data assembler.

Figure 5B:
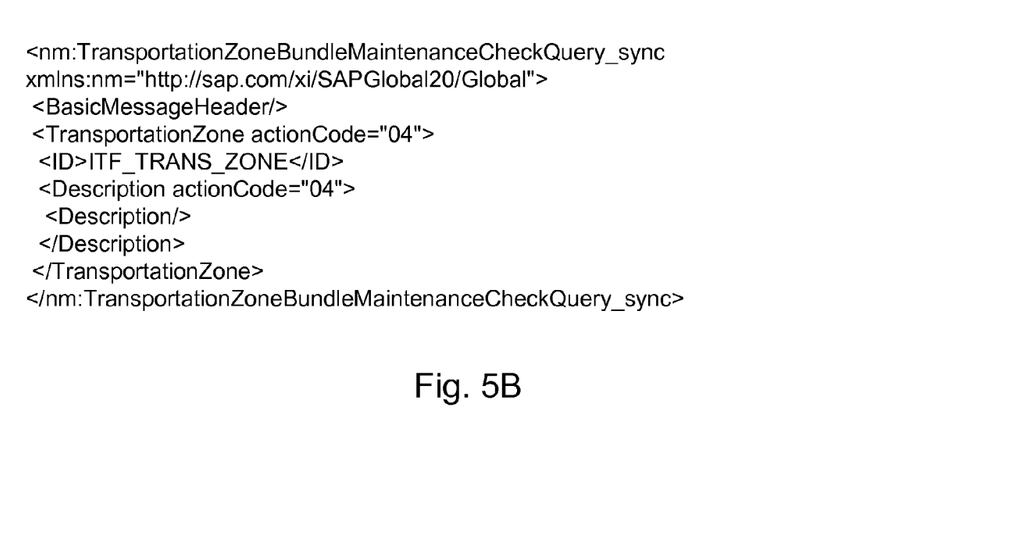
FIGS. 5B and 5C depict examples of request messages.
Figure 5C:
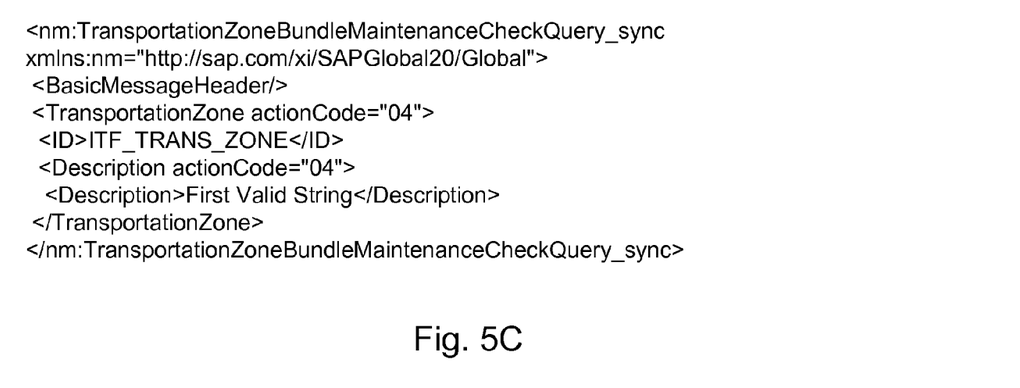

Processing repeats with step 410 for the next data element, listed in the Reference XML 222, to be tested. Accordingly, the TDC 244 will contain as many request messages 244 (test data) as there are data elements to be tested. FIGS. 5B and 5C illustrate examples of generated request messages.

Figure 7:
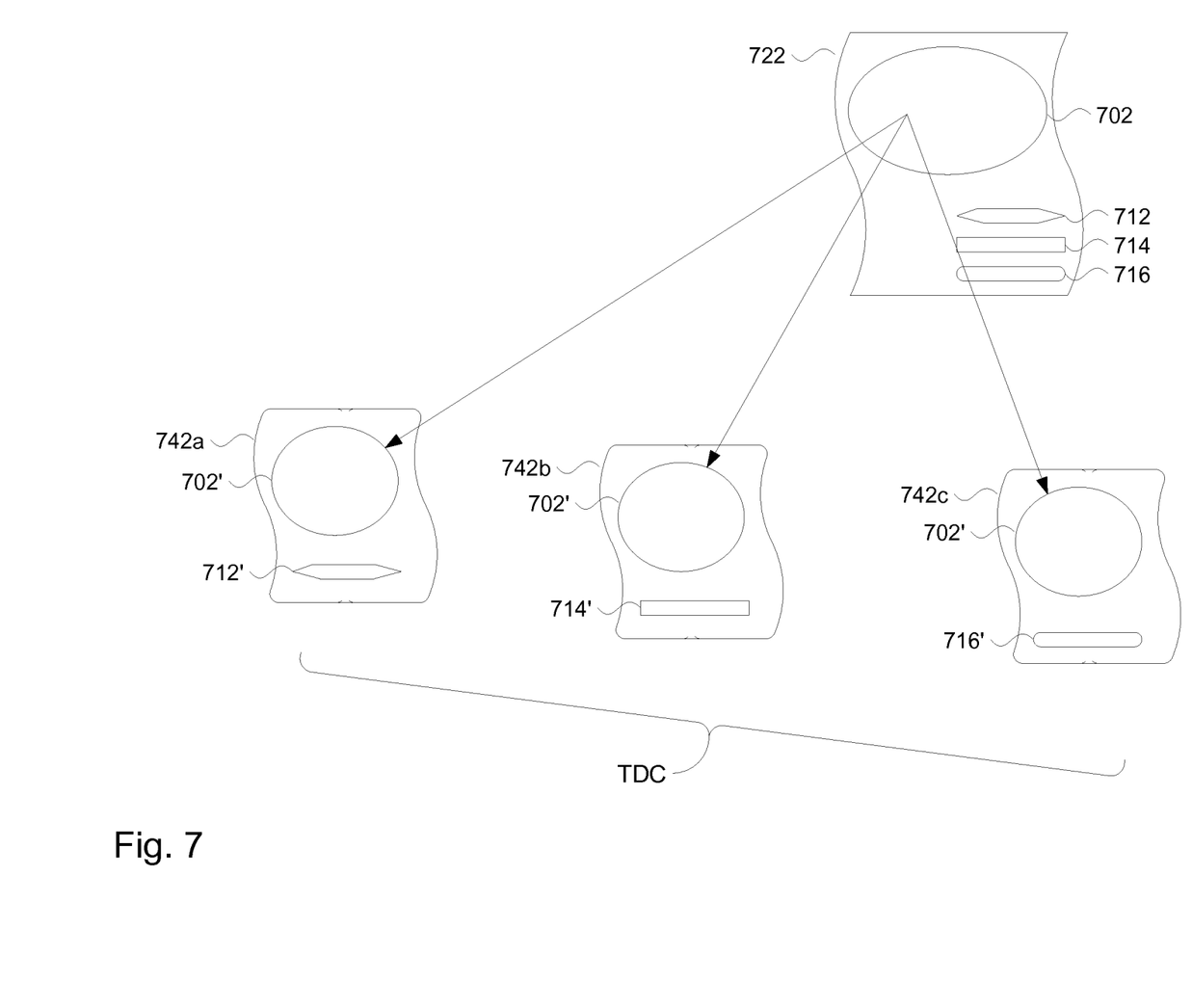
FIG. 7 illustrates a data relation between a Reference XML and request messages in accordance with principles of the present invention.

It will be appreciated that each request message contains substantially the same information, with the difference between request messages being the data element to be tested. This aspect of the present invention is illustrated in FIG. 7. A Reference XML 722 includes a section 702 comprising a set of mandatory data elements and their respective default values, and a list of data elements 712, 714, 716 to be tested. The test data that is generated using the Reference XML 722 comprises three request messages 742a, 742b, 742c; one for each data element 712, 714, 716 to be tested. Each request message comprises a message portion 702' that is generated from the mandatory data elements and their respective default values 702 specified in the Reference XML 722. However, each request message differs in regard to the data element to be tested. Thus, request message 742a comprises a message 712' configured to test the data element 712, specified in the Reference XML 722. Likewise, request message 742b comprises a message 714' configured to test the data element 714, specified in the Reference XML 722. And request message 742c comprises a message 716' configured to test the data element 716, specified in the Reference XML 722.

Two test categories were discussed above: positive element test and negative element test. It can be appreciated of course that other test categories may be defined. For example, in embodiments, test categories for delta handling may be provided. The term "delta handling" refers to a whereby one business application may update fields in a business object instance stored in another business application. A software service may be provided to do this. However, instead of transmitting all of the data fields comprising the business object instance, only those fields in the business object instance being updated (i.e., the "delta) need to be transmitted between business applications. Delta handling reduces the size of the request messages sent to the software service by including information only for those fields that are being updated (e.g., modified, created, or deleted).

Accordingly, a test category of positive tests for delta handling is a test category in which a request message comprises valid data values for delta handling. The request message may include a list of identifiers of the fields in the business object to be updated, corresponding action codes (e.g., create, delete, modify, etc.), and corresponding data values if applicable. In the case of a positive test for delta handling, the request messages contain valid action codes and valid data values. Similarly, for a test category of negative tests for delta handling, the request messages may contain invalid action codes and invalid data values, or combinations of valid an invalid information.

The positive element test category and the negative element test category are referred to as "simple tests", since each request message tests for only one data element. The positive and negative delta handling tests represent examples of "compound" tests. In embodiments, another compound test category may test for two or more combinations of data elements. For example, an all-pairs test category may involve testing pairs of data elements. Suppose a software service defines data elements ColorSelection, Size, FabricSelection, and StyleSelection. A simple test category (e.g., positive element test), may generate a TDC 244 that contains four request messages 242, one request message for each data element. By contrast, an all-pairs test category may generate a TDC 244 that contains six request messages, one for each combination of pairs of data elements: color/size, color/fabric, color/style, size/fabric, size/style, and fabric/style. A positive all-pairs test category may test for valid values, while a negative all-pairs test category may test for invalid values.

In embodiments, manually created request messages may also be incorporated in the TDC 244. Manual request messages are suitable when valid test data cannot be automatically generated; for example, the user may want to test for a specific combination of data. Semantic dependence on the software service may be another situation where manually generated test data is called for, and so on.

Figure 8:
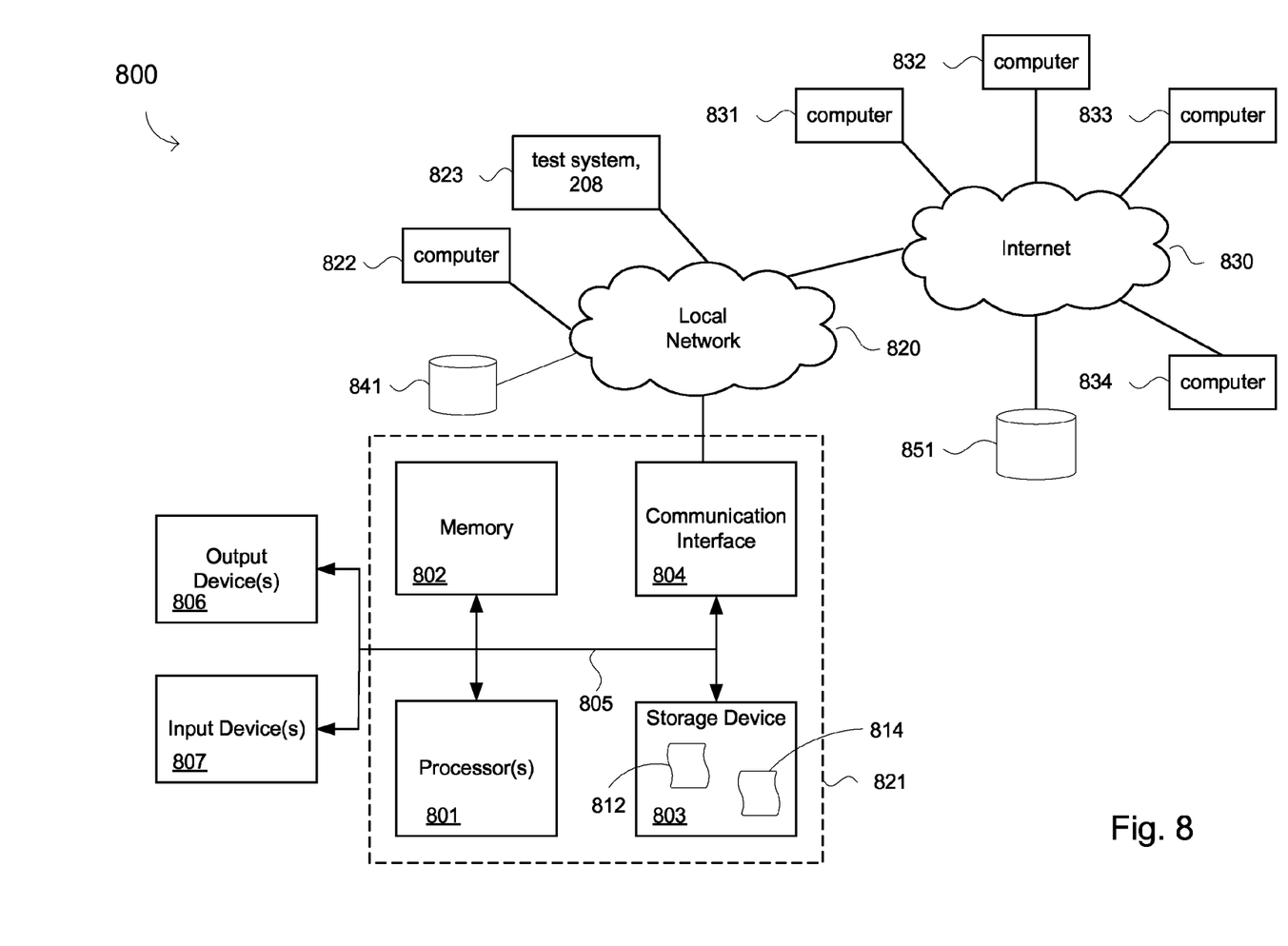
FIG. 8 depicts a computer system configured in accordance with the present invention.

FIG. 8 is a block diagram of a system 800 according to some embodiments. The system 800 includes computers 821-823 and one or more storage systems 841 interconnected by a local network 820 such as a wide area network (WAN). In some embodiments, the system 800 may include computers 831-834 and one or more storage systems 851 connected to the Internet 830. The local network 820 may be connected to the Internet 830.

Each computer (e.g., computer 821) may be configured as a general purpose computing apparatus and may execute program code to perform any of the functions described herein. For example, computer 821 may be configured as a first business application that executes the service consumer 202 (FIG. 2). Another computer (e.g., 822) may be configured as a second business application that executes the software service 204. Still another computer 823 may be configured as the test system 208 (FIG. 2).

Each computer (e.g., computer 821) includes, among its components, a processor component 801 (comprising one or more processing units) operatively coupled to a communication interface 804, a data storage device 803, one or more input devices 807, one or more output devices 806, and a memory 802. The communication interface 804 may facilitate communication on the on local network to access other systems, such as storage system 841 for example. For example, the storage system 841 may represent one or more of the several data stores 222, 224, 226, 228, 232, and 234 shown in FIG. 2.

Input device(s) 807 may include, for example, a keyboard, a keypad, a mouse or other pointing device, a microphone, knob or a switch, an infra-red (IR) port, a docking station, a touch screen, and so on. Input device(s) 807 may be used, for example, to enter information into the computer. Output device(s) 806 may include, for example, a display (e.g., a display screen), a speaker, a printer, and so on. Additional elements (not shown) may be including according to some embodiments.

The data storage device 803 may comprise any appropriate persistent storage device, including combinations of magnetic storage devices (e.g., magnetic tape, hard disk drives and flash memory), optical storage devices, Read Only Memory (ROM) devices, etc., while memory 802 may comprise Random Access Memory (RAM).

The data storage device 803 may store program code 812 which may be executed by the processor component 801 to cause the computer to perform any one or more of the processes and methods described herein. For example, the program code 812 in computer 823 may be configured to implement the test system 208 described herein. Embodiments are not limited to execution of these processes by a single apparatus.

The data storage device 803 may store data structures 814 such as object instance data, runtime objects, and any other data described herein. The data storage device 803 may also store data and other program code for providing additional functionality and/or which are necessary for operation thereof, such as device drivers, operating system files, etc.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for generating test data for software services comprising operating a computer to perform steps of:

accessing a first data store comprising data that identify a plurality of data elements of a software service separate from the first data store;

for each data element identified in the first data store, generating a test document comprising:
  accessing a second data store, separate from the first data store, comprising metadata information that characterize data elements of the software service, including metadata information associated with said each data element;
  accessing a third data store comprising a plurality of data values;
  obtaining a data value for said each data element from the third data store, wherein the data value is selected based on the metadata information associated with said each data element;
  obtaining default values from the first data store for additional data elements among the plurality of data elements; and
  forming a request message to be sent to an interface of the software services comprising an identifier of said each data element and its associated data value and identifiers of the additional data elements and their respective associated default values.

2. The method of claim 1 further comprising generating a second test document for a second data element among the plurality of data elements.

3. The method of claim 2 further comprising storing the first test document and the second test document in a data repository comprising a plurality of test documents, wherein the test data comprises the plurality of test documents.

4. The method of claim 1 further comprising receiving category information, wherein the data value selected for said each data element is either a valid data value or an invalid data value, depending on the category information.

5. The method of claim 1 wherein the metadata information indicates a data type of each of the data elements.

6. The method of claim 1 wherein the software services interface is expressed in a document based on XML and the identifiers of the data elements are XML tags.

7. The method of claim 1 wherein the first test document includes test data for a second data element in addition to test data for said each data element.

8. A computer system comprising:
  a processor; and
  a data store having stored therein computer executable program code, the computer executable program code configured to cause the processor to:
    access a first data store comprising data that identify a plurality of data elements of a software service separate from the first data store;
    generate, for each data element identified in the first data store, a test document, wherein the processor:
      accesses a second data store, separate from the first data store, comprising metadata information that characterize data elements of the software service, including metadata information associated with said each data element;
      accesses a third data store comprising a plurality of data values;
      obtains a data value for said each data element from the third data store, wherein the data value is selected based on the metadata information associated with said each data element;
      obtains default values from the first data store for additional data elements among the plurality of data elements; and
      forms a request message to be sent to an interface of the software services comprising an identifier of said each data element and its associated data value and identifiers of the additional data elements and their respective associated default values.

9. The computer system of claim 8 wherein the processor further generates a second test document for a second data element among the plurality of data elements.

10. The computer system of claim 9 wherein the processor stores the first test document and the second test document in a data repository comprising a plurality of test documents, wherein the test data comprises the plurality of test documents.

11. The computer system of claim 8 wherein the processor further receives category information, wherein the data value selected for said each data element is either a valid data value or an invalid data value, depending on the category information.

12. The computer system of claim 11 wherein the category information includes a positive element test category, a negative element test category, a positive test delta handling test category, a negative test delta handling test category, and an all-pairs test category.

13. The computer system of claim 8 wherein the metadata information indicates a data type of each of the data elements.

14. The computer system of claim 8 wherein the software services interface is expressed in a document based on XML and the identifiers of the data elements are XML tags.

15. A non-transitory tangible computer-readable medium having stored thereon executable program instructions configured to cause a computer to perform steps of:
  accessing a first data store comprising data that identify a plurality of data elements of a software service separate from the first data store;
  for each data element identified in the first data store, generating a test document comprising:
    accessing a second data store, separate from the first data store, comprising metadata information that characterize data elements of the software service, including metadata information associated with said each data element;
    accessing a third data store comprising a plurality of data values;
    obtaining a data value for said each data element from the third data store, wherein the data value is selected based on the metadata information associated with said each data element;
    obtaining default values from the first data store for additional data elements among the plurality of data elements; and
    forming a request message to be sent to an interface of the software services comprising an identifier of said each data element and its associated data value and identifiers of the additional data elements and their respective associated default values.

16. The computer readable medium of claim 15 wherein the executable program instructions are further configured to cause the computer to perform a step of generating a second test document for a second data element among the plurality of data elements.

17. The computer readable medium of claim 15 wherein the executable program instructions are further configured to cause the computer to perform a step of storing the first test document among a plurality of test documents.

18. The computer readable medium of claim 15 wherein the metadata information indicates a data type of each of the data elements.

19. The computer readable medium of claim 15 wherein the software services interface is expressed in a document based on XML and the identifiers of the data elements are XML tags.

20. The computer readable medium of claim 15 wherein the first test document includes test data for a second data element in addition to test data for the first data element.

* * * * *